United States Patent
Khanna

(10) Patent No.: US 12,111,919 B2
(45) Date of Patent: Oct. 8, 2024

(54) SYSTEMS AND METHODS FOR QUANTIFYING FILE ACCESS RISK EXPOSURE BY AN ENDPOINT IN A NETWORK ENVIRONMENT

(71) Applicant: Fortinet, Inc., Sunnyvale, CA (US)

(72) Inventor: Sameer T. Khanna, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 263 days.

(21) Appl. No.: 17/464,413

(22) Filed: Sep. 1, 2021

(65) Prior Publication Data

US 2023/0058569 A1 Feb. 23, 2023

Related U.S. Application Data

(60) Provisional application No. 63/235,887, filed on Aug. 23, 2021.

(51) Int. Cl.
*G06F 21/55* (2013.01)
*G06F 18/24* (2023.01)
(Continued)

(52) U.S. Cl.
CPC .......... *G06F 21/552* (2013.01); *G06F 18/24* (2023.01); *G06F 21/316* (2013.01);
(Continued)

(58) Field of Classification Search
CPC ...... G06F 21/552; G06F 18/24; G06F 21/316; G06F 21/6218; G06F 40/242;
(Continued)

(56) References Cited

U.S. PATENT DOCUMENTS

| 11,651,313 B1* | 5/2023 | Fridakis ............ G06Q 10/0635 |
| | | 705/7.28 |
| 2017/0061123 A1* | 3/2017 | Parker-Wood ........ G06F 21/556 |

(Continued)

OTHER PUBLICATIONS

Wang, Xiaobin; Sun, Yonglin; Wang, Yongjun; "An abnormal file access behavior detection approach based on file path diversity," International Conference on Information and Communications Technologies (ICT 2014), Nanjing, China, 2014, 5 pages.*

(Continued)

*Primary Examiner* — Victor Lesniewski
(74) *Attorney, Agent, or Firm* — Jaffery Watson Hamilton & DeSanctis LLP

(57) ABSTRACT

Systems, devices, and methods are discussed for identifying possible improper file accesses by an endpoint device. In some cases an agent is placed on each system to be surveilled that records the absolute paths for each file accessed for each user. This information may be accumulated and sent to a central server or computer for analysis of all such file accesses on a user basis. In some cases, a file access tree is created, and in some implementations be pruned of branches and leaves if deemed to be duplicates or very similar to other branched and leaves via a Levenshtein distance threshold. The resulting tree's edges may be scaled in particular implementations based on the deviation of a user's file accesses from their sphere of permissions. A variance metric may be computed from the final tree's form to capture the user's access patterns.

11 Claims, 7 Drawing Sheets

(51) Int. Cl.
  *G06F 21/31* (2013.01)
  *G06F 21/62* (2013.01)
  *G06F 40/242* (2020.01)
  *G06F 40/279* (2020.01)
  *G06F 40/284* (2020.01)
  *G06V 10/56* (2022.01)
  *G06V 10/764* (2022.01)
  *G06V 10/776* (2022.01)
  *G06V 40/20* (2022.01)
  *H04L 9/40* (2022.01)
  *H04L 43/045* (2022.01)
  *G06F 40/205* (2020.01)

(52) U.S. Cl.
  CPC ........ *G06F 21/6218* (2013.01); *G06F 40/242* (2020.01); *G06F 40/279* (2020.01); *G06F 40/284* (2020.01); *G06V 10/56* (2022.01); *G06V 10/764* (2022.01); *G06V 10/776* (2022.01); *G06V 40/20* (2022.01); *H04L 43/045* (2013.01); *H04L 63/1416* (2013.01); *H04L 63/1425* (2013.01); *G06F 40/205* (2020.01)

(58) Field of Classification Search
  CPC ..... G06F 40/279; G06F 40/284; G06V 10/56; G06V 10/764; G06V 10/776; G06V 40/20; H04L 63/1416; H04L 63/1425; H04L 43/045
  See application file for complete search history.

(56) References Cited

U.S. PATENT DOCUMENTS

2017/0070527 A1* 3/2017 Bailey .................... H04L 43/12
2018/0191726 A1* 7/2018 Luukkala .............. H04L 63/101
2018/0336256 A1* 11/2018 Li ....................... G06F 16/2246
2020/0186544 A1* 6/2020 Dichiu ................ H04L 63/1433
2021/0374237 A1* 12/2021 Momeni Milajerdi ......................
                                        G06F 21/554
2023/0039039 A1* 2/2023 Keraudy ................. G06F 21/62

OTHER PUBLICATIONS

Coulter, Rory; Zhang, Jun; Pan, Lei; Xiang, Yang; "Unmasking Windows Advanced Persistent Threat Execution," IEEE 19th International Conference on Trust, Security and Privacy in Computing and Communications (TrustCom 2020), Guangzhou, China, 2020, pp. 268-276.*
Khanna "Conical Classification for Computationally Efficient One-Class Topic Determination" Cornell Universtiy Oct. 31, 2021.

* cited by examiner

SYSTEMS AND METHODS FOR QUANTIFYING FILE ACCESS RISK EXPOSURE BY AN ENDPOINT IN A NETWORK ENVIRONMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

CROSS REFERENCE TO RELATED APPLICATIONS

The present application claims priority to U.S. Provisional Patent Application No. 63/235,887 entitled "Computer Vision User Entity Behavior Analytics", and filed Aug. 23, 2021 by Khanna. The entirety of the aforementioned application is incorporated herein by reference for all purposes.

FIELD

Embodiments discussed generally relate to securing network environments, and more particularly to systems and methods for identifying possible improper file access.

BACKGROUND

Company networks are commonly accessed by a large number of company employees and other authorized persons. In some cases, such authorized persons use their network access privileges to access files for improper reasons. In benign cases of improper file accesses, it is simply an authorized person who mistakenly accessed files beyond their needs, while in the more malignant cases such improper file accesses may be part of a corporate espionage scheme. It is difficult to control access to all files and most corporations simply rely on the expected honesty of their employees and other authorized persons, however, this is proving to be insufficient.

Thus, there exists a need in the art for more advanced approaches, devices, and systems for developing and implementing security measures in a network environment.

SUMMARY

Various embodiments provide systems and methods for identifying possible improper file access.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
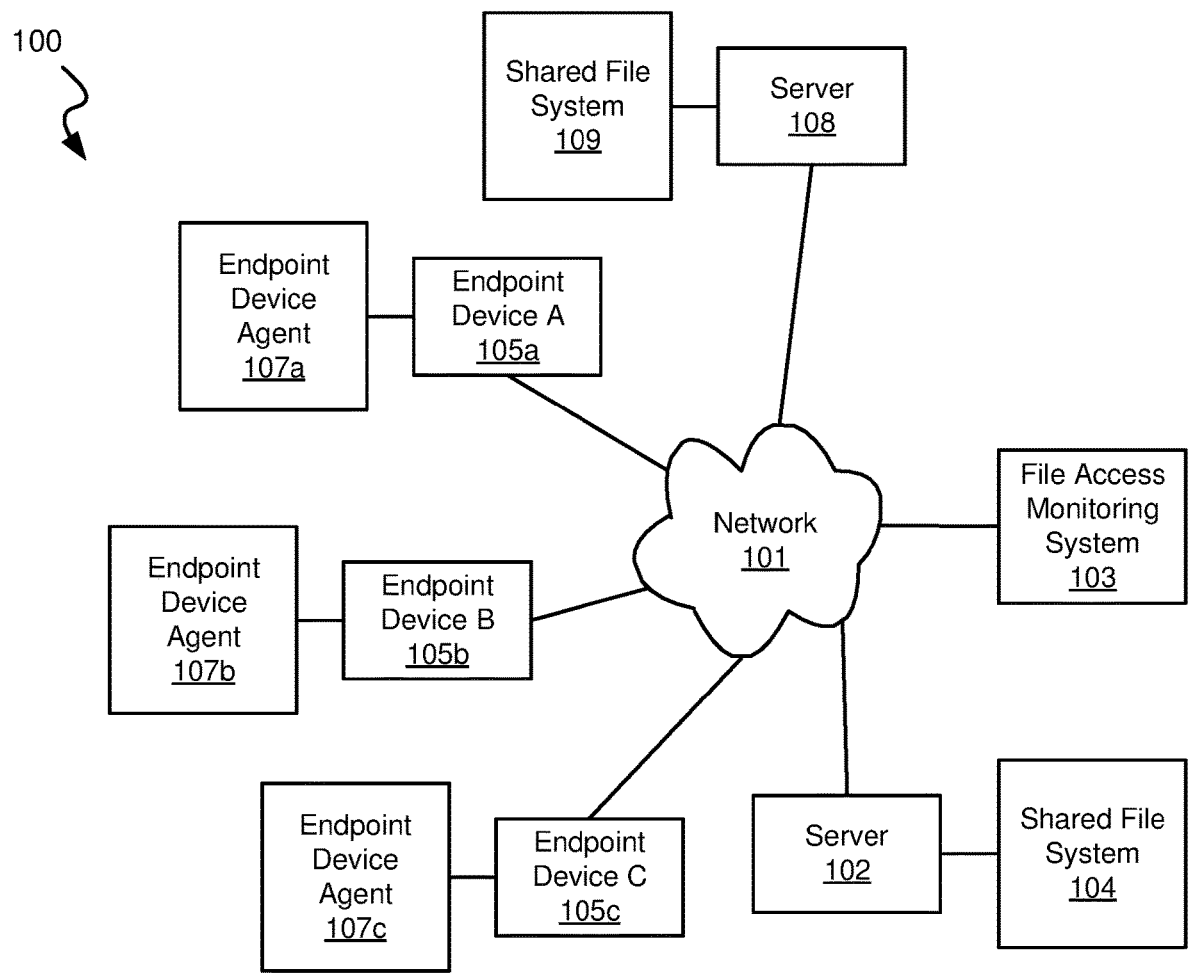
FIGS. 1A-1E illustrate a network architecture including a file access monitoring system in accordance with some embodiments.

Various embodiments provide systems and methods for identifying possible improper file access.

An example enterprise network may have tens of thousands of files distributed across endpoint devices, servers, and other locations on a network. A given user will typically access files within limited set of locations to perform their work. Such locations will include their work computers, shared access computers for a group in which the user operates, and occasionally a colleague's computer. Embodiments discussed herein monitor most if not all file accesses performed by an endpoint device associated with a given user over a time period. Where file accesses venture away from an expected norm, such behavior can be flagged as suspicious and an alert provided to a human expert for further consideration and performance of a risk assessment. As just some of many examples, such ventures away from the norm may include, but are not limited to, rapidly expanding the number of computers accessed by an endpoint device, expanding the number of files accessed via directories on shared computers holding information not relevant to the user's work.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for flagging suspicious file access behavior. Such methods include calculating, by a processing resource, a file access metric based at least in part on a first file access path, a second file access path, and a third file access path. In such embodiments, the first file access path, the second file access path, and the third file access path each indicate respective file access attempts performed using an endpoint device, and the value of the file access metric corresponds to a likelihood that the endpoint device has been used for problematic file accesses. In some instances of the aforementioned embodiments, the file access metric is a file access variance indicating a variance across at least the first file access path, the second file access path, and the third file access path. An increase in the value of the file access metric indicates a greater likelihood that the endpoint device has been used for malicious file accesses.

In various instances of the aforementioned embodiments, calculating the file access metric includes calculating: a first distance between the first file access path and the second file access path, a second distance between the first file access path and the third file access path, a third distance between the second file access path and the third file access path. In some such instances, calculating the file access metric further includes calculating, by the processing resource, the file path variance based at least in part on the first distance, the second distance, and the third distance.

In some instances of the aforementioned embodiments, calculating the first distance includes: calculating a first root distance between a root and a file indicated in the first file access path, calculating a second root distance between the root and a file indicated in the second file access path, calculating a third root distance between the root and a farthest common ancestor in both the first file access path and the second file access path, and combining the first root difference, the second root difference, and the third root distance to yield the first distance.

In various instances of the aforementioned embodiments, calculating the first distance includes: calculating a first root distance between a root and a file indicated in the first file access path, calculating a second root distance between the root and a file indicated in the second file access path, calculating a third root distance between the root and a farthest common ancestor in both the first file access path and the second file access path, scaling the first root distance by a first scaling factor to yield a first scaled root distance, scaling the second root distance by a second scaling factor to yield a second scaled root distance, scaling the third root distance by a third scaling factor to yield a third scaled root distance, and combining the first scaled root difference, the second scaled root difference, and the third scaled root distance to yield the first distance. In some such instances, the first scaling factor corresponds to a first permissions level required to access a first file indicated by the first file access path, and the second scaling factor corresponds to a second permissions level required to access a second file indicated by the second file access path. In some cases, first scaling factor is different from the second scaling factor. In one or more cases, two or more of the first scaling factor, the second scaling factor, and/or the third scaling factor are the same. In various cases, all of the first scaling factor, the second scaling factor, and the third scaling factor are different.

In various instances of the aforementioned embodiments, the methods further include: calculating, by the processing resource, a Levenshtein difference between the first file access path and the second file access path to yield a difference value; and modifying, by the processing resource, the second file access path to be identical to the first file access path based at least in part on the difference value. In one or more instances of the aforementioned embodiments, the methods further include: comparing, by the processing resource, the file access metric with a threshold value; and reporting, by the processing resource, suspicious file access behavior by the endpoint device based upon the comparison of the file access metric and the threshold value.

Other embodiments provide systems for flagging suspicious file access behavior. Such systems include: a processing resource, and a non-transitory computer-readable medium. The non-transitory computer readable medium has stored therein instructions that when executed by the processing resource cause the processing resource to: calculate a file access metric based at least in part on a first file access path, a second file access path, and a third file access path; compare the file access metric with a threshold value; and report suspicious file access behavior by the endpoint device based upon the comparison of the file access metric and the threshold value. The first file access path, the second file access path, and the third file access path each indicate respective file access attempts performed using an endpoint device, and the value of the file access metric corresponds to a likelihood that the endpoint device has been used for problematic file accesses.

Yet other embodiments provide non-transitory computer readable media embodying a set of instructions, which when executed by a processing resource, causes the processing resource to calculate a file access metric based at least in part on a first file access path, a second file access path, and a third file access path. The first file access path, the second file access path, and the third file access path each indicate respective file access attempts performed using an endpoint device, and the value of the file access metric corresponds to a likelihood that the endpoint device has been used for problematic file accesses.

Turning to FIG. 1A, network architecture 100 is shown in accordance with some embodiments. In the context of network architecture 100, a number of endpoint devices (e.g., an endpoint device 105a, an endpoint device 105b, and an endpoint device 105c) and servers (e.g., a server 102 and a server 108) are communicably coupled via a network 101. Network 101 may be any type of communication network known in the art. Those skilled in the art will appreciate that, network 101 can be a wireless network, a wired network, or a combination thereof that can be implemented as one of the various types of networks, such as an Intranet, a Local Area Network (LAN), a Wide Area Network (WAN), an Internet, and the like. Further, network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Servers 102, 108 may be any processor based device that allows for communication via network 101 and access to one or more elements to other devices connected to network 101. In some embodiments, the elements are shared file systems and/or applications. In this embodiment, server 102 provides access to a shared file system 103, and server 108 provides access to a shared file system 109. As an example, shared file system 103 may include a number of files that are related to work performed by a group of persons responsible for one type of activity within a corporation maintaining network 101, and shared file system 109 may include a number of files that are related to work performed by another group of persons responsible for another type of activity within the corporation maintaining network 101. Based upon the disclosure provided herein, one of ordinary skill in the art will appreciate a number of servers, file systems, applications, and the like that may be accessible via network 101 in accordance with different embodiments. Shared file systems 103, 109 may be any storage capable of maintaining one of more files that are accessible by different users of network 101. In some cases, one or more files on shared file systems 103, 109 may be accessed only by those providing authorization credentials. Based upon the disclosure provided herein, one of ordinary skill in the art will recognize a variety of shared file systems that may be implemented and used in relation to different embodiments.

Endpoint devices 105a-c may be any processor based device that is capable of accessing files stored local to the particular endpoint device, accessing files stored local to another endpoint device via network 101, and/or accessing files included in a shared file system via network 101. Such endpoint devices may be, but are not limited to, a desktop computer, a laptop computer, a smart phone, a tablet computer, or the like. Based upon the disclosure provided herein, one of ordinary skill in the art will recognize a variety of devices and/or systems that may be used to implement endpoint devices 105 in accordance with different embodiments.

Endpoint device 105a has installed thereon an endpoint device agent 107a; endpoint device 105b has installed thereon an endpoint device agent 107b; and endpoint device 105c has installed thereon an endpoint device agent 107c. Each of endpoint agents 107 is configured to detect and record a file access by the respective endpoint device 105, and to periodically provide the recorded file access information to file access monitoring system 103. As more fully discussed below, in some embodiments the file access information includes a listing of a file access including the file and all directories from a root to the file.

File access monitoring system 103 may be any processor based device that is capable of accessing file access information and calculating a file path variance value based at least in part on the access file access information. Based upon the disclosure provided herein, one of ordinary skill in the art will recognize a variety of devices and/or systems that may be used to implement file access monitoring system 103 in accordance with different embodiments. As more fully described below, calculation of such a file path variance value for a given endpoint over a time period provides some indication of potentially suspicious file access before being performed using the particular endpoint device.

Figure 1B:
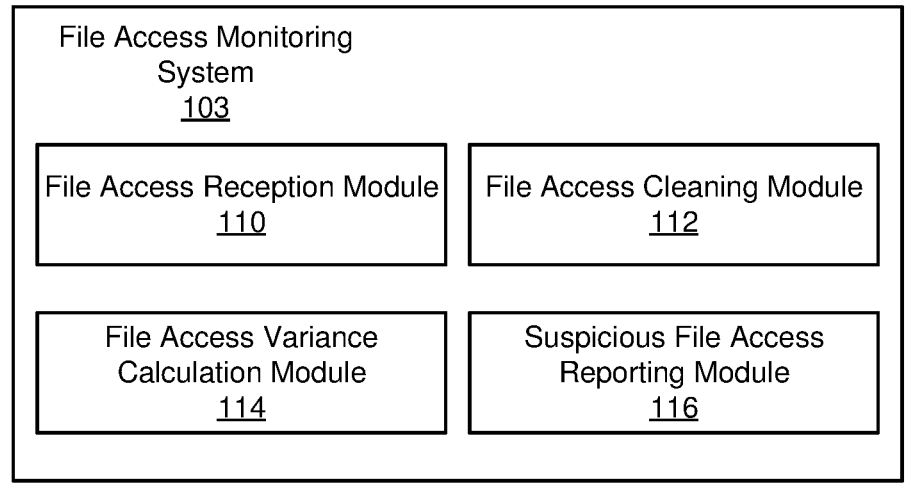

Turning to FIG. 1B, an example implementation of file access monitoring system 103 is shown in accordance with some embodiments. As shown in this example, file access monitoring system 103 includes: a file access reception module 110, a file access cleaning module 112, a file access variance calculation module 114, and a suspicious file access reporting module 116.

File access reception module 110 is configured to receive file access information from an endpoint device agent indicating file accesses performed using an associated endpoint device, and to form such file access information into a file access report. In some embodiments, suspicious file access reception module 110 performs the functions discussed below in relation to blocks 202-206 of FIG. 2.

File access cleaning module 112 is configured to modify a file access report by modifying any recorded access paths that have, for example, typographical errors. In making the modifications one access path is modified to be identical to another access path. As such, the same number of access paths are included, but the number of unique access paths is reduced. The changes result in a modified file access report. In some embodiments, calculation of Levenshtein distance between respective access paths is used to determine potential typographical errors. In some embodiments, file access cleaning module 112 is configured to perform the method discussed below in relation to FIG. 3.

File access variance calculation module 114 is configured to calculate a variance across a number of access paths generated for a given endpoint device over a period of time. In some embodiments, file access variance calculation module 114 performs the calculation function discussed below in relation to block 210 of FIG. 2. In other embodiments, file access variance calculation module 114 uses scaling factors to increase the cost of accessing unauthorized files. In such embodiments, file access variance calculation module 114 performs the calculation function discussed below in relation to block 410 of FIG. 4.

Suspicious file access reporting module 116 is configured to determine whether the calculated file access variance exceeds a threshold value, and if so to report suspicious file access for the endpoint device corresponding to the calculated file access variance. In some embodiments, suspicious file access reporting module 116 performs the function discussed below in relation to blocks 212-214 of FIG. 2.

Figure 1C:
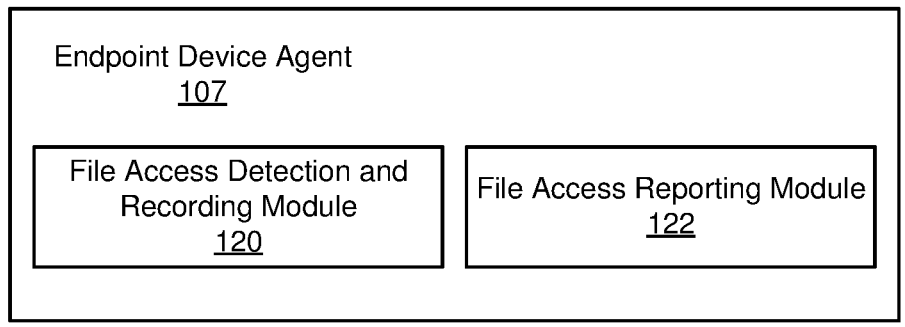

Turning to FIG. 1C, an example implementation of endpoint device agent 107 is shown in accordance with some embodiments. As shown, endpoint device agent 107 includes: a file access detection and recording module 120, and a file access reporting module 122. File access detection and recording module 120 is configured to identify file accesses performed using the endpoint device upon which endpoint device agent 107 is installed. File access reporting module 122 is configured to report file accesses as file access information to file access monitoring system 103. The file access information indicates a particular endpoint device that was used to access the file(s) indicated by the file access information. Such file access information includes one or more access paths for files that indicate the location of respective files that were accessed using the identified endpoint device. In some embodiments, the access paths indicate a location of a file relative to a root directory similar to those discussed below in relation to FIG. 1D. In some embodiments, an endpoint device agent provides such file access information each time a file access is performed using the endpoint device on which the endpoint device agent is installed. In other embodiments, an endpoint device agent provides batches of file access information including file access information detected and recorded over a defined period. In some cases, the defined period is user programmable.

Figure 1D:
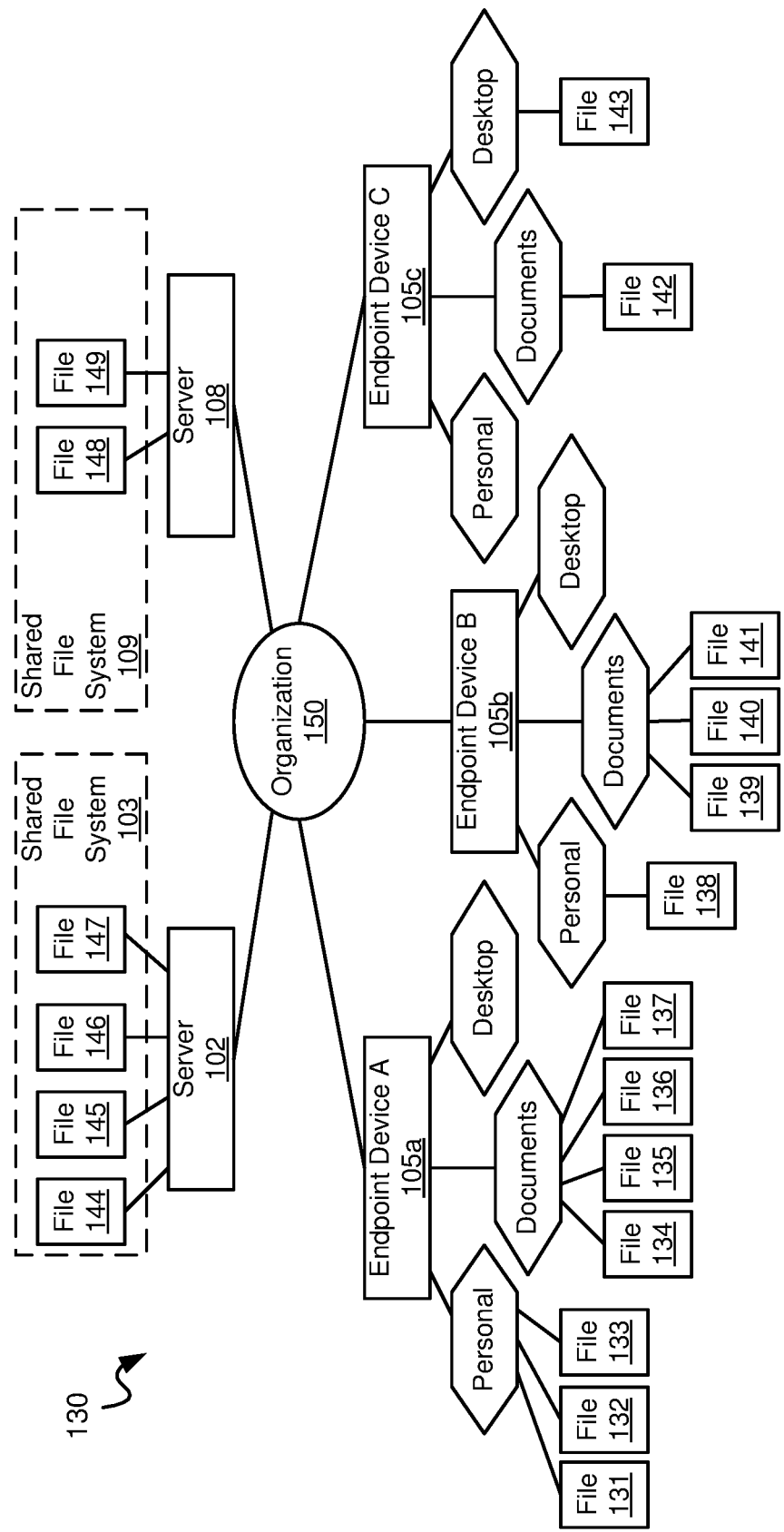

Turning to FIG. 1D, an example of files 130 accessed by endpoint device 105*a* during a time period is shown to illustrate the calculation of file path variance in accordance with different embodiments. As shown, endpoint device 105*a* accesses:

(a) a file 131 that is maintained in a personal area of endpoint device 105*a*, and in some embodiments such an access would be detected and recorded by endpoint device agent 107*a* as the following access path: Organization 150/endpoint device 105*a*/personal/file 131;

(b) a file 132 that is maintained in a personal area of endpoint device 105*a*, and in some embodiments such an access would be detected and recorded by endpoint device agent 107*a* as the following access path: Organization 150/endpoint device 105*a*/personal/file 132;

(c) a file 133 that is maintained in a personal area of endpoint device 105*a*, and in some embodiments such an access would be detected and recorded by endpoint device agent 107*a* as the following access path: Organization 150/endpoint device 105*a*/personal/file 133;

(d) a file 134 that is maintained in a documents area of endpoint device 105*a*, and in some embodiments such an access would be detected and recorded by endpoint device agent 107*a* as the following access path: Organization 150/endpoint device 105*a*/documents/file 134;

(e) a file 135 that is maintained in a documents area of endpoint device 105*a*, and in some embodiments such an access would be detected and recorded by endpoint device agent 107*a* as the following access path: Organization 150/endpoint device 105*a*/documents/file 135;

(f) a file 136 that is maintained in a documents area of endpoint device 105*a*, and in some embodiments such an access would be detected and recorded by endpoint device agent 107*a* as the following access path: Organization 150/endpoint device 105*a*/documents/file 136;

(g) a file 137 that is maintained in a documents area of endpoint device 105*a*, and in some embodiments such an access would be detected and recorded by endpoint device agent 107*a* as the following access path: Organization 150/endpoint device 105*a*/documents/file 134;

(h) a file 138 that is maintained in a personal area of endpoint device 105*b*, and in some embodiments such an access would be detected and recorded by endpoint device agent 107*a* as the following access path: Organization 150/endpoint device 105*b*/personal/file 138;

(i) a file 139 that is maintained in a documents area of endpoint device 105*b*, and in some embodiments such an access would be detected and recorded by endpoint device agent 107*a* as the following access path: Organization 150/endpoint device 105*b*/documents/file 139;

(j) a file 140 that is maintained in a documents area of endpoint device 105*b*, and in some embodiments such an access would be detected and recorded by endpoint device agent 107*a* as the following access path: Organization 150/endpoint device 105*b*/documents/file 140;

(k) a file 141 that is maintained in a documents area of endpoint device 105*b*, and in some embodiments such an access would be detected and recorded by endpoint device agent 107*a* as the following access path: Organization 150/endpoint device 105*b*/documents/file 141;

(l) a file 142 that is maintained in a documents area of endpoint device 105*c*, and in some embodiments such an access would be detected and recorded by endpoint device agent 107*a* as the following access path: Organization 150/endpoint device 105*c*/documents/file 142;

(m) a file 143 that is maintained in a desktop area of endpoint device 105*c*, and in some embodiments such an access would be detected and recorded by endpoint device agent 107*a* as the following access path: Organization 150/endpoint device 105*c*/desktop/file 143;

(n) a file 144 that is maintained in shared file system 103, and in some embodiments such an access would be detected and recorded by endpoint device agent 107*a* as the following access path: Organization 150/server 102/shared file system 103/file 144;

(o) a file 145 that is maintained in shared file system 103, and in some embodiments such an access would be detected and recorded by endpoint device agent 107*a* as the following access path: Organization 150/server 102/shared file system 103/file 145;

(p) a file 146 that is maintained in shared file system 103, and in some embodiments such an access would be detected and recorded by endpoint device agent 107*a* as the following access path: Organization 150/server 102/shared file system 103/file 146;

(q) a file 147 that is maintained in shared file system 103, and in some embodiments such an access would be detected and recorded by endpoint device agent 107*a* as the following access path: Organization 150/server 102/shared file system 103/file 147;

(r) a file 148 that is maintained in shared file system 103, and in some embodiments such an access would be detected and recorded by endpoint device agent 107*a* as the following access path: Organization 150/server 108/shared file system 109/file 148; and (s) a file 149 that is maintained in shared file system 103, and in some embodiments such an access would be detected and recorded by endpoint device agent 107*a* as the following access path: Organization 150/server 108/shared file system 109/file 149.

As previously noted, such a pattern of file access is an example used for illustrative purposes, and based upon the disclosure provided herein, one of ordinary skill in the art will recognize that a great variety of file access patterns may be detected and recorded by an endpoint device agent 107 executing to record file accesses from a respective one of endpoint devices 105.

Figure 1E:
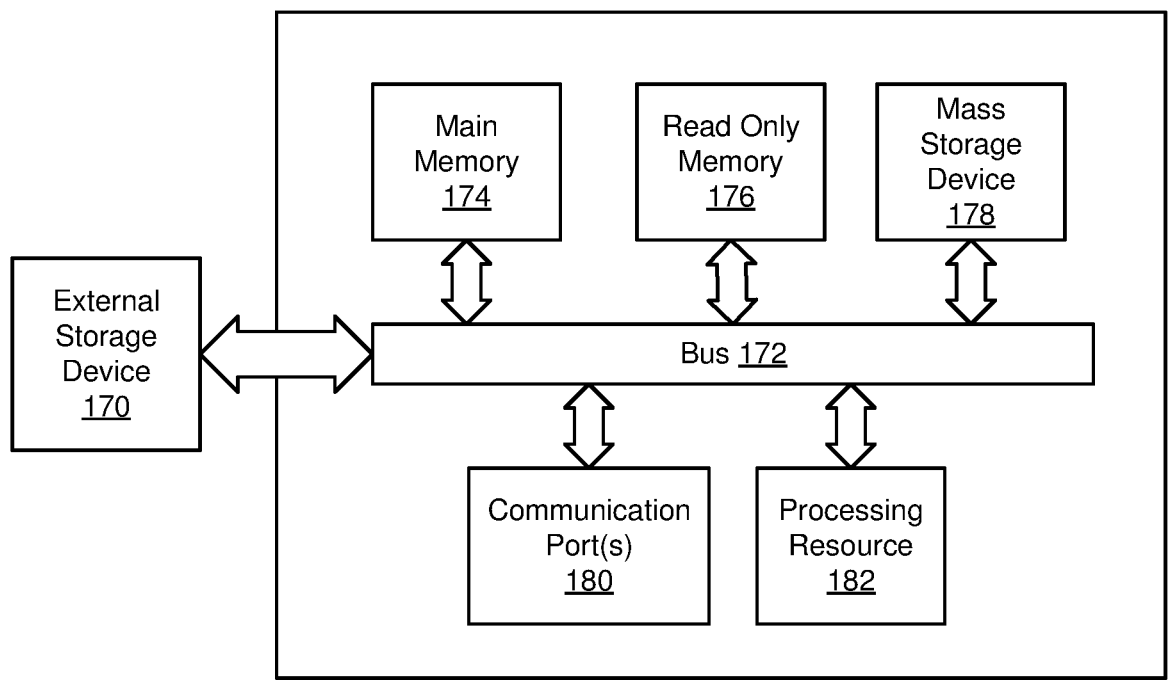

Turning to FIG. 1E, an example computer system 160 is shown in which or with which embodiments of the present disclosure may be utilized. As shown in FIG. 1B, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of file access monitoring system 103, server 102, server 108, endpoint device 105*a*, endpoint device 105*b*, and/or endpoint device 105*c*.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
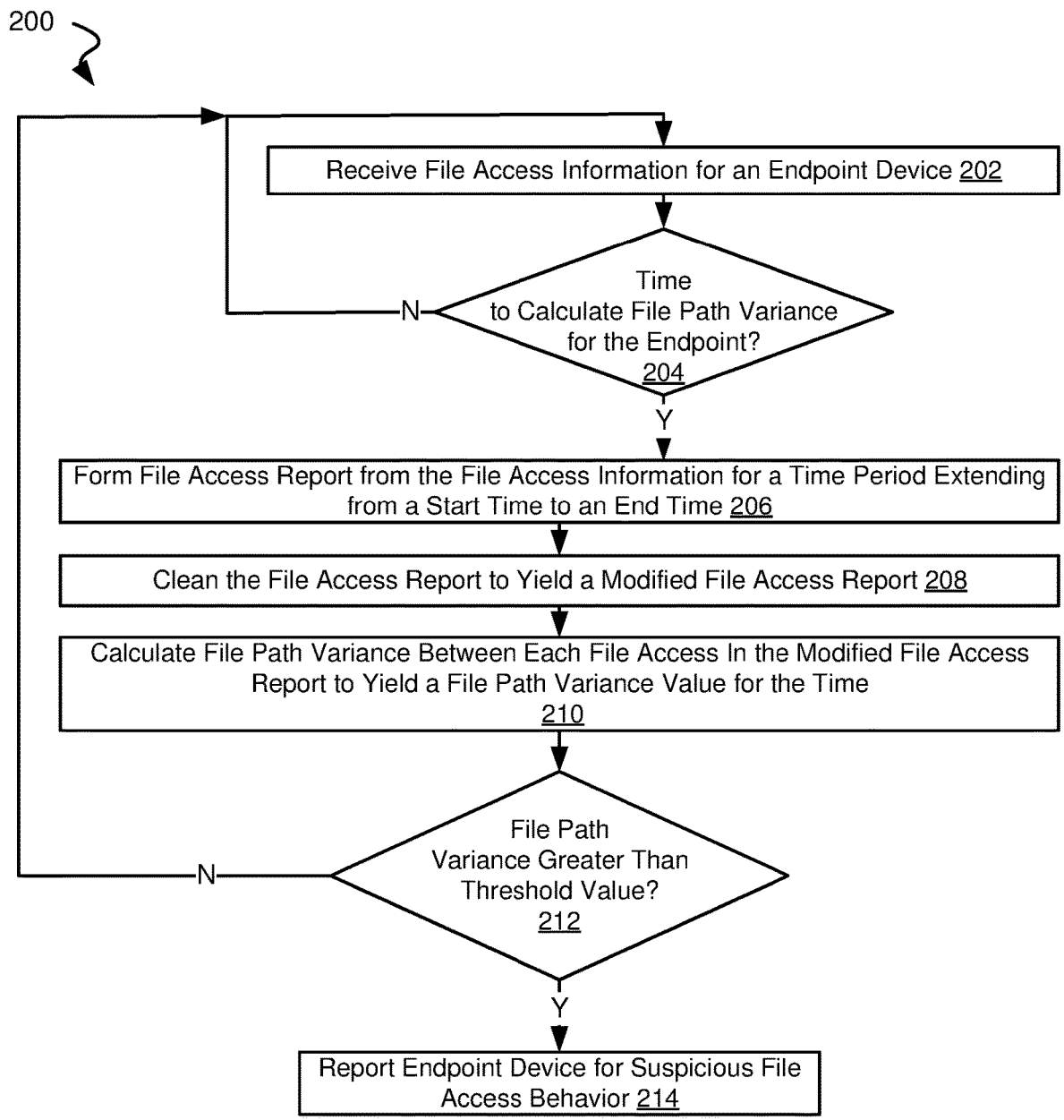
FIG. 2 is a flow diagram showing a method in accordance with various embodiments for monitoring file access by an endpoint device based upon calculating a file path variance.

Turning to FIG. 2, a flow diagram 200 shows a method in accordance with various embodiments for monitoring file access by an endpoint device based upon calculating a file path variance value. Following flow diagram 200, file access information is received from an endpoint device (block 202). The file access information indicates a particular endpoint device that was used to access the file(s) indicated by the file access information. In some embodiments, the endpoint device is identified by its MAC address. Based upon the disclosure provided herein, one of ordinary skill in the art will recognize a variety of ways that the endpoint device may be identified in relation to the file access information.

Such file access information includes one or more access paths for files that indicate the location of respective files that were accessed using the identified endpoint device. In some embodiments, the access paths indicate a location of a file relative to a root directory similar to those discussed above in relation to FIG. 1D. In some embodiments, an endpoint device agent provides such file access information each time a file access is performed using the endpoint device on which the endpoint device agent is installed. In other embodiments, an endpoint device agent provides batches of file access information including file access information detected and recorded over a defined period. In some cases, the defined period is user programmable. Whether received individually or in batches, the received file access information is stored until processing for the particular endpoint device is triggered.

It is determined whether a time period for calculating file path variance for the particular endpoint device has arrived (block 204). In some embodiments, file path variance is calculated once per day for each endpoint device serviced by a file access monitoring system. In such an embodiment the time period would be twenty-four hours. Based upon the disclosure provided herein, one of ordinary skill in the art will recognize a variety of time periods that may be used in relation to different embodiments.

Once the time period has expired (block 204), a file access report is formed by assembling all of the file access information that was received from a given endpoint device over the time period (block 206). Such a report may be in any format known in the art and includes the file access information for each file that was accessed over the time period. The file access report is cleaned to modify file access information that is substantially similar, and thus likely to represent, for example, a typographical error or other anomalies made when performing the file access (block 208). The changes result in a modified file access report. As an example, the file access report may include the following two access path entries:

(1) Root/Machine/Colour; and
(2) Root/Machine/Color.

As "colour" and "color" are the same thing differing only in dialect, one of the two spellings is selected and the two access path entries are modified in the modified file access report as (where "color" is selected):

(1) Root/Machine/Color; and
(2) Root/Machine/Color.

As another example, the file access report may include the following two access path entries:

(1) Root/Machine/Backend; and
(2) Root/Machine/Bockend.

As "bockend" is a likely misspelling of "backend", one of the two spellings is selected and the two access path entries are modified in the modified file access report as (where "backend" is selected):

(1) Root/Machine/Backend; and
(2) Root/Machine/Backend.

As yet another example where the misspelling occurs in a sub-directory name, the file access report may include the following two access path entries:

(1) Root/Backend/File; and
(2) Root/Bockend/File.

Again, as "bockend" is a likely misspelling of "backend", one of the two spellings is selected and the two access path entries are modified in the modified file access report as (where "backend" is selected):

(1) Root/Backend/File; and
(2) Root/Backend/File.

Figure 3:
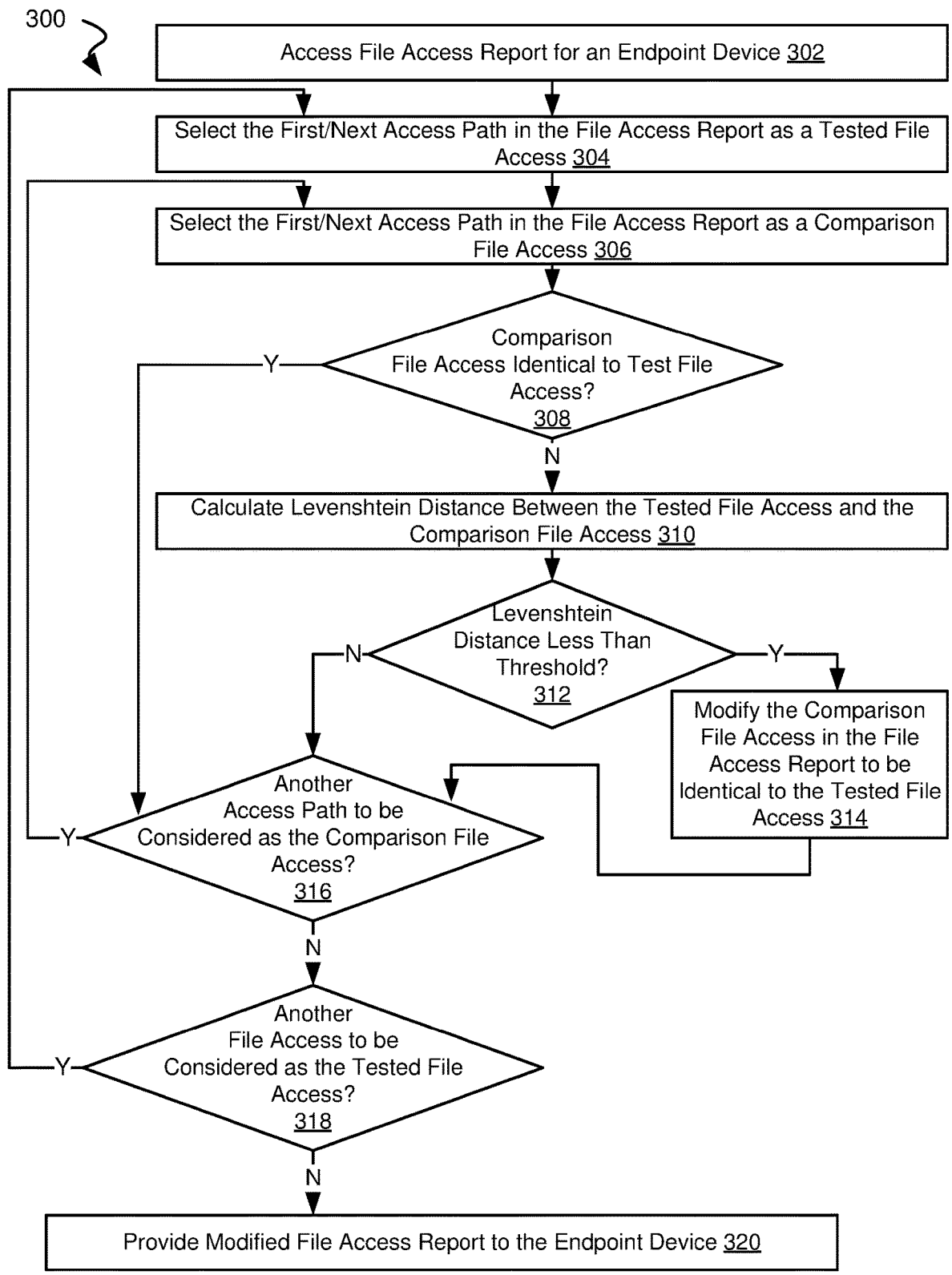
FIG. 3 is a flow diagram showing a method for cleaning a group of accessed file locations in accordance with some embodiments.

FIG. 3 below discuses one approach for file access report cleaning that relies on Levenshtein distance that may be used in relation to some embodiments. As is known in the art, Levenshtein distance is the minimum number of single-character edits (insertions, deletions or substitutions) required to change one word into the other. Based upon the disclosure provided herein, one of ordinary skill in the art will recognize a variety of approaches for file access cleaning that may be used in accordance with different embodiments.

File path variance is calculated for the particular endpoint device represented by the file access information in the modified file access report (block 210). Calculating file path variance includes calculating the distance ($d_{i,j}$) between each access path in the modified file access report using the following equation:

$$d_{i,j} = \text{Dist}(\text{Root}, i) + \text{Dist}(\text{Root}, j) - 2*\text{Dist}(\text{Root}, \text{Common}),$$

Where: i indicates a first selected access path entry in the modified access path report, j indicates a first selected access path entry in the modified access path report, Root indicates the root of all access paths (e.g., Organization 150 in FIG. 1C above), and Common indicates the farthest common ancestor between the respective access path trees.

As an example, where i and j are respectively the following access paths discussed above in relation to FIG. 1D:
(i) Organization 150/endpoint device 105a/documents/file 135; and
(j) Organization 150/server 102/shared file system 103/file 146;

Root would be Organization 150, Common would also be Organization 150 as that is the farthest common ancestor of the two access paths. Dist(Root, i) is four (4) as there are four elements in the first access path (i); Dist(Root, j) is four (4) as there are four elements in the second access path (j); and Dist(Root, Common) is 0 as the common ancestor is Organization 150. Thus, the distance between the two access paths, $d_{i,j}$, is eight (8).

As another example, where i and j are respectively the following access paths discussed above in relation to FIG. 1D:
(i) Organization 150/endpoint device 105a/personal/file 133; and
(j) Organization 150/endpoint device 105a/documents/file 134;

Root would be Organization 150, Common would be endpoint device 105a as that is the farthest common ancestor of the two access paths. Dist(Root, i) is four (4) as there are four elements in the first access path (i); Dist(Root, j) is four (4) as there are four elements in the second access path (j); and Dist(Root, Common) is 1 as the common ancestor is endpoint device 105a. Thus, the distance between the two access paths, $d_{i,j}$, is six (6).

Calculating file path variance (FPV) is done using the following equation:

$$FPV = \frac{1}{2N^2 - N} \sum_{i=1}^{N} \sum_{j=1}^{N} 1\{i \neq j\} d_{ij}^2$$

where N is the total number of access paths in the modified file access report, $1\{i \neq j\}$ is an indicator variable indicating that the value calculated for the distance between the same access path entry in the modified file path report is not included in the calculation (i.e., the distance between entry 1 and entry 1 in the modified file path report is not included in the calculation), and i and j are the same as that described above in relation to the distance equation. The preceding file path variance equation is a standard variance equation modified to incorporate the aforementioned $d_{i,j}$ equation across the respective access paths from the modified file access report.

Using the example of file accesses performed using endpoint device 105a and the access paths described above in relation to FIG. 1D, N is nineteen (19) (i.e., the number of file accesses (files 131-149). The following values for i=1 are included in the calculation:
1. for j=1 (i.e., i=file 131 and j=file 131) the value of $d_{i,j}$ is zero (0) as it is not included in the result as indicated by $1\{i \neq j\}$;
2. for j=2 (i.e., i=file 131 and j=file 132) the value of $d_{i,j}$ is four (4);
3. for j=3 (i.e., i=file 131 and j=file 133) the value of $d_{i,j}$ is four (4);
4. for j=4 (i.e., i=file 131 and j=file 134) the value of $d_{i,j}$ is six (6);
5. for j=5 (i.e., i=file 131 and j=file 135) the value of $d_{i,j}$ is six (6);
6. for j=6 (i.e., i=file 131 and j=file 136) the value of $d_{i,j}$ is six (6);
7. for j=7 (i.e., i=file 131 and j=file 137) the value of $d_{i,j}$ is six (6);
8. for j=8 (i.e., i=file 131 and j=file 138) the value of $d_{i,j}$ is eight (8);
9. for j=9 (i.e., i=file 131 and j=file 139) the value of $d_{i,j}$ is eight (8);
10. for j=10 (i.e., i=file 131 and j=file 140) the value of $d_{i,j}$ is eight (8);
11. for j=11 (i.e., i=file 131 and j=file 141) the value of $d_{i,j}$ is eight (8);
12. for j=12 (i.e., i=file 131 and j=file 142) the value of $d_{i,j}$ is eight (8);
13. for j=13 (i.e., i=file 131 and j=file 143) the value of $d_{i,j}$ is eight (8);
14. for j=14 (i.e., i=file 131 and j=file 144) the value of $d_{i,j}$ is eight (8);
15. for j=15 (i.e., i=file 131 and j=file 145) the value of $d_{i,j}$ is eight (8);
16. for j=16 (i.e., i=file 131 and j=file 146) the value of $d_{i,j}$ is eight (8);
17. for j=17 (i.e., i=file 131 and j=file 147) the value of $d_{i,j}$ is eight (8);
18. for j=18 (i.e., i=file 131 and j=file 148) the value of $d_{i,j}$ is eight (8); and
19. for j=19 (i.e., i=file 131 and j=file 149) the value of $d_{i,j}$ is eight (8).

Each of the aforementioned values are squared (i.e., $d_{i,j}^2$) and the squares are summed. The above mentioned process of including distance values for each access path for j=1 to 19 is repeated for values of i=2 to 19 with each of the resulting sum of squares being summed.

The resulting file path variance (FPV) value is compared with a threshold value (block 212). In some embodiments, the threshold value is user programmable. Where it is found that the file path variance value is greater than the threshold value (block 212), a report is generated indicating suspicious file access behavior ongoing in relation to the endpoint device associated with the file access information used to create the modified file access report (block 214). In some embodiments, this suspicious behavior report is electronically transmitted to a human expert for further consideration.

Turning to FIG. 3, a flow diagram 300 shows a method for cleaning a group of accessed file locations in accordance with some embodiments. Following flow diagram 300, a file access report for a particular endpoint device is accessed from a storage area (block 302). This is the file access report that was formed in block 206 of FIG. 2. The first/next entry (i.e., access path) in the file access report is selected as a tested file access (block 304) and the first/next entry (i.e., access path) in the file access report is selected as a comparison file access (block 306). For the first pass, the comparison file access and the tested file access are the same file access. That said, for the selected tested file access, each entry in the file access report is selected in turn as the comparison file access. This process is continued until all entries in the file access report are compared with each other.

The selected comparison file access is compared with the selected test access (block 308). The results of this comparison indicates the number of differences between the comparison file access and the tested file access which are used to calculate a Levenshtein difference between the comparison file access and the tested file access (block 310). As mentioned above, the Levenshtein distance is the minimum number of single-character edits (insertions, deletions or substitutions) required to change comparison file access into tested file access.

The calculated Levenshtein distance is compared with a threshold value (block 312). In some embodiments, the threshold value is user programmable, and is used to make a determination as to whether one of the comparison file access or the tested file access is a typographical error of the other or that both the comparison file access and the tested file access appear to be intended unique file accesses.

Where the calculated Levenshtein value is less than the threshold value (block 312), the comparison file access and the tested file access are considered to be the same, and as such the comparison file access is modified to be identified to be the tested file access (block 314). By making one identical to the other, the file access report will exhibit fewer unique file access entries, but will have two identical entries that will be used when calculating file path variance as discussed above in relation to FIG. 2.

Where either the calculated Levenshtein value is less than the threshold value (block 312) or the file access report has already been modified to make the comparison file access identical to the tested file access (block 314), it is determined whether there is another entry in the file access report to be compared with the selected tested file access (block 316). Where another access path remains to be compared with the tested file access (block 316), the next entry is selected as the comparison file access (block 306) and the processes of blocks 308-316 are repeated for the next comparison file access.

Alternatively where no other entries remain in the file access report to be compared with the selected tested file access (block 316), it is determined whether another entry in the file access report remains to be considered as the tested file access (block 318). Where another access path remains to be considered the tested file access (block 318), the next entry is selected as the tested file access (block 304) and the processes of blocks 304-318 are repeated for the next tested file access. Once no entries remain in the file access report to be considered the tested file access (block 318), the file access report including any modifications that were made is provided as a modified file access report for the particular endpoint device.

Figure 4:
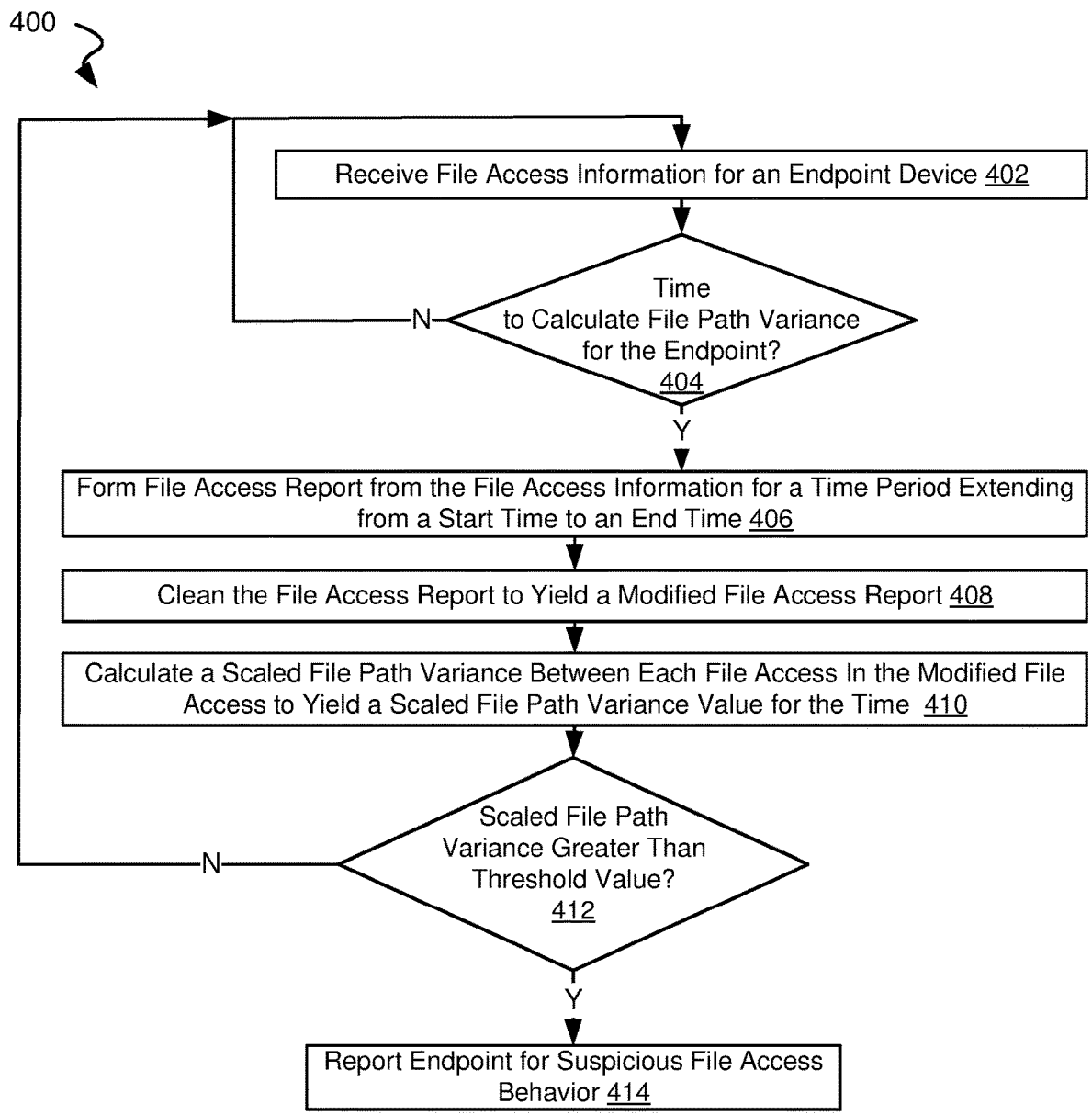
FIG. 4 is a flow diagram showing a method in accordance with some embodiments for monitoring file access by an endpoint device based upon calculating a scaled file path variance.

Turning to FIG. 4, a flow diagram 400 shows a method in accordance with various embodiments for monitoring file access by an endpoint device based upon calculating a scaled file path variance. Following flow diagram 400, file access information is received from an endpoint device (block 402). The file access information indicates a particular endpoint device that was used to access the file(s) indicated by the file access information. Such file access information is similar to that described above in relation to FIG. 2.

It is determined whether a time period for calculating file path variance for the particular endpoint device has arrived (block 404). In some embodiments, file path variance is calculated once per day for each endpoint device serviced by a file access monitoring system. In such an embodiment the time period would be twenty-four hours. Based upon the disclosure provided herein, one of ordinary skill in the art will recognize a variety of time periods that may be used in relation to different embodiments.

Once the time period has expired (block 404), a file access report is formed by assembling all of the file access information that was received from a given endpoint device over the time period (block 406). Such a report may be in any format known in the art and includes the file access information for each file that was accessed over the time period. The file access report is cleaned to modify file access information that is substantially similar, and thus likely to represent, for example, a typographical error or other anomalies made when performing the file access (block 408). The changes result in a modified file access report. FIG. 3 discussed above provides one approach for file access report cleaning that relies on Levenshtein distance that may be used in relation to some embodiments. Based upon the disclosure provided herein, one of ordinary skill in the art will recognize a variety of approaches for file access cleaning that may be used in accordance with different embodiments.

Scaled file path variance is calculated for the particular endpoint device represented by the file access information in the modified file access report (block 410). Calculating scaled file path variance includes calculating a scaled distance ($d_{i,j}$) between each access path in the modified file access report using the following equation:

$$\text{Scaled } d_{i,j} = w_i * \text{Dist}(\text{Root}, i) + w_j * \text{Dist}(\text{Root}, j) - 2 * w_{common} * \text{Dist}(\text{Root}, \text{Common}),$$

Where: i indicates a first selected access path entry in the modified access path report, j indicates a first selected access path entry in the modified access path report, Root indicates the root of all access paths (e.g., Organization 150 in FIG. 1C above), and Common indicates the farthest common ancestor between the respective access path trees.

The scaling factors $w_i$, $w_j$, and $w_{common}$ are user programmable. In general, $w_{node}$ represents the permission level of the given node. Thus, $w_i$ represents the permission level of node i, $w_j$ represents the permission level of node j, and $w_{common}$ represents the permission level of node common. Thus, for example, where the file is accessed from a location where the user of the accessing endpoint device has full permissions (e.g., files maintained on the personal computer of the user) the respective scaling factor $w_{node}$ (i.e., a respective one of $w_i$, $w_j$, or $w_{common}$) may be selected as unity (1) as permission based concerns are not troubling. In contrast, if the user attempts to access a file maintained in relation to an endpoint device that the user does not have permissions to access (e.g., files maintained on a colleague's computer) or for files maintained in relation to a server supporting a department which the user is not included, the respective scaling factor $w_{node}$ (i.e., a respective one of $w_i$, $w_j$, or $w_{common}$) may be selected as two (2) as permission based concerns are more of an issue. If the user has permission to access a given node, $w_{node}$ will be low and thus the scaled distance for accessing the file is relatively low. The value of $w_{node}$ may be increased proportionally to how far beyond the sphere of permissions the accessed node lies. As an example, access to files 131-137 by endpoint device 105*a* may incur a first value of $w_{node}$ as full permissions exist, access to files 142-143 by endpoint device 105*b* may incur a second value of $w_{node}$ where the second value is greater than the first value as permissions do not exist, and access to files 148-149 by endpoint device 105*c* may incur a third value of $w_{node}$ where the third value is greater than the second value as permissions do not exist and files in shared file system 109 are regarded as highly protected).

As an example, where i and j are respectively the following access paths discussed above in relation to FIG. 1D:
  (ii) Organization 150/endpoint device 105*a*/documents/file 135; and
  (i) Organization 150/server 102/shared file system 103/file 146;

Root would be Organization 150, Common would also be Organization 150 as that is the farthest common ancestor of the two access paths. Dist(Root, i) is four (4) as there are four elements in the first access path (i); Dist(Root, j) is four (4) as there are four elements in the second access path (j); and Dist(Root, Common) is 0 as the common ancestor is Organization 150. In the example, the value of $w_{node}$ for file 135 is one (1), the value of $w_{node}$ for file 146 is 1.5, and the value for $w_{common}$ is one (1). Thus, the scaled distance between the two access paths, scaled $d_{i,j}$, is ten (10).

As another example, where i and j are respectively the following access paths discussed above in relation to FIG. 1D:
  (ii) Organization 150/endpoint device 105*a*/personal/file 133; and
  (j) Organization 150/endpoint device 105*a*/documents/file 134;

Root would be Organization 150, Common would be endpoint device 105*a* as that is the farthest common ancestor of the two access paths. Dist(Root, i) is four (4) as there are four elements in the first access path (i); Dist(Root, j) is four (4) as there are four elements in the second access path (j); and Dist(Root, Common) is 1 as the common ancestor is endpoint device 105*a*. In the example, the value of $w_{node}$ for file 133 is one (1), the value of $w_{node}$ for file 134 is one (1), and the value for $w_{common}$ is one (1). Thus, the scaled distance between the two access paths, scaled $d_{i,j}$, is eight (8).

As discussed above in relation to FIG. 2, calculating file path variance (FPV) is done using the following equation:

$$FPV = \frac{1}{2N^2 - N} \sum_{i=1}^{N} \sum_{j=1}^{N} 1\{i \neq j\} d_{ij}^2$$

except that $d_{i,j}$ is the scaled scaled $d_{i,j}$. Again, the preceding file variance equation is a standard variance equation modified to incorporate the aforementioned scaled $d_{i,j}$ equation across the respective access paths from the modified file access report.

Using the example of file accesses performed using endpoint device 105*a* and the access paths described above in relation to FIG. 1D, N is nineteen (19) (i.e., the number of file accesses (files 131-149). The values of $w_{node}$ are: one (1) for files 131-137, 1.5 for files 138-143, one (1) for files 144-147; and two (2) for files 148-149. It is noted that the aforementioned values of $w_{node}$ are examples, and based upon the disclosure provided herein, one of ordinary skill in the art will recognize a variety of values that may be used in relation to different embodiments. The following values for i=1 are included in the calculation:
1. for j=1 (i.e., i=file 131 and j=file 131) the value of $d_{i,j}$ is zero (0) as it is not included in the result as indicated by 1{i≠j};
2. for j=2 (i.e., i=file 131 and j=file 132) the value of scaled $d_{i,j}$ is 1*4;
3. for j=3 (i.e., i=file 131 and j=file 133) the value of scaled $d_{i,j}$ is 1*4;
4. for j=4 (i.e., i=file 131 and j=file 134) the value of scaled $d_{i,j}$ is 1*6;
5. for j=5 (i.e., i=file 131 and j=file 135) the value of scaled $d_{i,j}$ is 1*6;
6. for j=6 (i.e., i=file 131 and j=file 136) the value of scaled $d_{i,j}$ is 1*6;
7. for j=7 (i.e., i=file 131 and j=file 137) the value of scaled $d_{i,j}$ is 1*6;
8. for j=8 (i.e., i=file 131 and j=file 138) the value of scaled $d_{i,j}$ is 1*4+1.5*4;
9. for j=9 (i.e., i=file 131 and j=file 139) the value of scaled $d_{i,j}$ is 1*4+1.5*4;
10. for j=10 (i.e., i=file 131 and j=file 140) the value of scaled $d_{i,j}$ is 1*4+1.5*4;
11. for j=11 (i.e., i=file 131 and j=file 141) the value of scaled $d_{i,j}$ is 1*4+1.5*4;
12. for j=12 (i.e., i=file 131 and j=file 142) the value of scaled $d_{i,j}$ is 1*4+1.5*4;
13. for j=13 (i.e., i=file 131 and j=file 143) the value of scaled $d_{i,j}$ is 1*4+1.5*4;
14. for j=14 (i.e., i=file 131 and j=file 144) the value of scaled $d_{i,j}$ is 1*8;
15. for j=15 (i.e., i=file 131 and j=file 145) the value of scaled $d_{i,j}$ is 1*8;
16. for j=16 (i.e., i=file 131 and j=file 146) the value of scaled $d_{i,j}$ is 1*8;
17. for j=17 (i.e., i=file 131 and j=file 147) the value of scaled $d_{i,j}$ is 1*8;
18. for j=18 (i.e., i=file 131 and j=file 148) the value of scaled $d_{i,j}$ is 1*4+2*4; and
19. for j=19 (i.e., i=file 131 and j=file 149) the value of scaled $d_{i,j}$ is 1*4+2*4;

Each of the aforementioned values are squared (i.e., $d_{i,j}^2$) and the squares are summed. The above mentioned process of including distance values for each access path for j=1 to 19 is repeated for values of i=2 to 19 with each of the resulting sum of squares being summed.

The resulting file path variance (FPV) value is compared with a threshold value (block 412). In some embodiments, the threshold value is user programmable. Where it is found that the file path variance value is greater than the threshold value (block 412), a report is generated indicating suspicious file access behavior ongoing in relation to the endpoint device associated with the file access information used to create the modified file access report (block 414). In some embodiments, this suspicious behavior report is electronically transmitted to a human expert for further consideration.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for flagging suspicious file access behavior, the method comprising:

calculating, by a processing resource, a file access metric based at least in part on a first file access path, a second file access path, and a third file access path, wherein
the first file access path, the second file access path, and the third file access path each indicate respective file access attempts performed using an endpoint device;
the file access metric is a file access variance indicating a variance across at least the first file access path, the second file access path, and the third file access path; and wherein an increase in the value of the file access metric indicates a greater likelihood that the endpoint device has been used for malicious file accesses;
calculating the file access metric includes calculating: a first distance between the first file access path and the second file access path, a second distance between the first file access path and the third file access path, a third distance between the second file access path and the third file access path; and
calculating the first distance includes: calculating a first root distance between a root and a file indicated in the first file access path, calculating a second root distance between the root and a file indicated in the second file access path, calculating a third root distance between the root and a farthest common ancestor in both the first file access path and the second file access path, and combining the first root difference, the second root difference, and the third root distance to yield the first distance.

2. The method of claim 1, wherein calculating the file access metric further includes calculating, by the processing resource, the file path variance based at least in part on the first distance, the second distance, and the third distance.

3. The method of claim 1, the method further comprising:
calculating, by the processing resource, a Levenshtein difference between the first file access path and the second file access path to yield a difference value; and
modifying, by the processing resource, the second file access path to be identical to the first file access path based at least in part on the difference value.

4. The method of claim 1, the method further comprising:
comparing, by the processing resource, the file access metric with a threshold value; and reporting, by the processing resource, suspicious file access behavior by the endpoint device based upon the comparison of the file access metric and the threshold value.

5. A system for flagging suspicious file access behavior, the system comprising:
a processing resource;
a non-transitory computer-readable medium, coupled to the processing resource, having stored therein instructions that when executed by the processing resource cause the processing resource to:
calculate a file access metric based at least in part on a first file access path, a second file access path, and a third file access path, wherein the first file access path, the second file access path, and the third file access path each indicate respective file access attempts performed using an endpoint device;
compare the file access metric with a threshold value; and
report suspicious file access behavior by the endpoint device based upon the comparison of the file access metric and the threshold value; wherein further the file access metric is a file access variance indicating a variance across at least the first file access path, the second file access path, and the third file access path; and wherein an increase in the value of the file access metric indicates a greater likelihood that the endpoint device has been used for malicious file accesses;
calculating the file access metric includes calculating: a first distance between the first file access path and the second file access path, a second distance between the first file access path and the third file access path, a third distance between the second file access path and the third file access path; and
calculating the first distance includes: calculating a first root distance between a root and a file indicated in the first file access path, calculating a second root distance between the root and a file indicated in the second file access path, calculating a third root distance between the root and a farthest common ancestor in both the first file access path and the second file access path, and combining the first root difference, the second root difference, and the third root distance to yield the first distance.

6. The system of claim 5, wherein calculating the file access metric further includes calculating, by the processing resource, the file path variance based at least in part on the first distance, the second distance, and the third distance.

7. The system of claim 5, wherein instructions that when executed by the processing resource further cause the processing resource to:
calculate a Levenshtein difference between the first file access path and the second file access path to yield a difference value; and
modify the second file access path to be identical to the first file access path based at least in part on the difference value.

8. A method for flagging suspicious file access behavior, the method comprising:
calculating, by a processing resource, a file access metric based at least in part on a first file access path, a second file access path, and a third file access path, wherein
the first file access path, the second file access path, and the third file access path each indicate respective file access attempts performed using an endpoint device;
the file access metric is a file access variance indicating a variance across at least the first file access path, the second file access path, and the third file access path; and wherein an increase in the value of the file access metric indicates a greater likelihood that the endpoint device has been used for malicious file accesses;
calculating the file access metric includes calculating: a first distance between the first file access path and the second file access path, a second distance between the first file access path and the third file access path, a third distance between the second file access path and the third file access path;
calculating the first distance includes: calculating a first root distance between a root and a file indicated in the first file access path, calculating a second root distance between the root and a file indicated in the second file access path, calculating a third root distance between the root and a farthest common ancestor in both the first file access path and the second file access path, scaling the first root distance by a first scaling factor to yield a first scaled root distance, scaling the second root distance by a second scaling factor to yield a second scaled root distance, scaling the third root distance by a third scaling factor to yield a third scaled root distance, and combining the first scaled root difference, the second scaled root difference, and the third scaled root distance to yield the first distance.

9. The method of claim 8, wherein the first scaling factor corresponds to a first permissions level required to access a first file indicated by the first file access path, and wherein the second scaling factor corresponds to a second permissions level required to access a second file indicated by the second file access path.

10. The method of claim 8, wherein the first scaling factor is different from the second scaling factor.

11. The method of claim 10, wherein the first scaling factor is different from the third scaling factor, and wherein the second scaling factor is different from the third scaling factor.

* * * * *